United States Patent
Wagner et al.

(10) Patent No.: US 7,021,256 B2
(45) Date of Patent: Apr. 4, 2006

(54) ELECTROMAGNETIC HYDRAULIC VALVE, PARTICULARLY 3/2-WAY PILOT VALVE FOR CONTROLLING A VARIABLE VALVE DRIVE OF AN INTERNAL COMBUSTION ENGINE

(75) Inventors: Werner Wagner, Hirschaid (DE); Armin Braun, Altendorf (DE)

(73) Assignee: INA Schaeffler KG, (DE)

( * ) Notice: Subject to any disclaimer, the term of this patent is extended or adjusted under 35 U.S.C. 154(b) by 0 days.

(21) Appl. No.: 11/127,498

(22) Filed: May 11, 2005

(65) Prior Publication Data

US 2005/0274336 A1   Dec. 15, 2005

Related U.S. Application Data

(63) Continuation-in-part of application No. PCT/EP03/12209, filed on Nov. 3, 2003.

(30) Foreign Application Priority Data

Nov. 12, 2002  (DE) .............................. 102 52 431.9

(51) Int. Cl.
*F01L 9/04* (2006.01)
(52) U.S. Cl. ............................... 123/90.11; 123/90.12; 251/129.15
(58) Field of Classification Search ............. 123/90.11, 123/90.15, 90.17, 90.31, 90.12, 90.13; 251/129.01, 251/129.15
See application file for complete search history.

(56) References Cited

U.S. PATENT DOCUMENTS

| 4,578,662 | A | 3/1986 | Slavin et al. ............... 335/262 |
| 5,518,029 | A | 5/1996 | Schumacher et al. .. 137/625.65 |
| 6,024,060 | A | * | 2/2000 | Buehrle et al. .......... 123/90.12 |
| 6,047,673 | A | * | 4/2000 | Lohse et al. ............. 123/90.11 |
| 6,152,422 | A |   | 11/2000 | Staib et al. ............ 251/129.15 |
| 6,184,766 | B1 |   | 2/2001 | Kojima et al. ............... 335/255 |

(Continued)

FOREIGN PATENT DOCUMENTS

DE   36 09 366 A1   9/1987

(Continued)

OTHER PUBLICATIONS

International Search Report PCT/EP03/12209 dated Dec. 10, 2003.

(Continued)

*Primary Examiner*—Thomas Denion
*Assistant Examiner*—Ching Chang
(74) *Attorney, Agent, or Firm*—Ostrolenk, Faber, Gerb & Soffen,LLP (57) ABSTRACT

An electromagnetic hydraulic valve having an electromagnet with a coil winding arranged on a spool, and a magnet housing, a valve stem having a pressure connection, a tank connection and a consumer connection. The spool and the valve stem are a one-piece plastic body which has an axial longitudinal bore which is an armature space for a magnet armature and also is a control region for a closing body. The magnet housing, with a collar which projects into the longitudinal bore, forms a top magnet pole of the electromagnet. A bottom magnet pole, connected to the magnet housing in a magnetically conductive manner, of the electromagnet likewise projects into the longitudinal bore of the plastic body. The bottom magnet pole of the electromagnet is formed by an annular disk which is integrally cast in the plastic body and which, by a plurality of free sections and a plurality of radial webs at its outer circumference, is designed both as an element for fastening the magnet housing to the hydraulic valve and as an element for fastening the hydraulic valve to an engine block of an internal combustion engine.

17 Claims, 3 Drawing Sheets

U.S. PATENT DOCUMENTS 6,397,891 B1    6/2002    Neuhaus et al. ....... 137/625.65

FOREIGN PATENT DOCUMENTS

| DE | 4301670 | 7/1994 |
| DE | 197 25 289 A1 | 12/1998 |
| DE | 100 36 905 A1 | 10/2001 |
| FR | 2784439 | 4/2000 |
| WO | WO 98/40260 | 9/1998 |

OTHER PUBLICATIONS

Germany Search Report 102 52 431.9 dated Feb. 6, 2003.

* cited by examiner

Fig. 6

ELECTROMAGNETIC HYDRAULIC VALVE, PARTICULARLY 3/2-WAY PILOT VALVE FOR CONTROLLING A VARIABLE VALVE DRIVE OF AN INTERNAL COMBUSTION ENGINE

CROSS REFERENCE TO RELATED APPLICATIONS

The present application is a continuation-in-part of PCT/EP03/12209 filed 3 Nov. 2003, which claims priority of German Application No. 102 52 431.9 filed 12 Nov. 2002. The PCT International Application was published in the German language.

FIELD OF THE INVENTION

The invention relates to an electromagnetic hydraulic valve which can be advantageously realized in particular on a 3/2-way directional control valve or pilot valve for controlling a variable valve drive of an internal combustion engine.

BACKGROUND OF THE INVENTION

DE 198 10 241 C2 has previously disclosed an electromagnetic hydraulic valve establishing the generic type which is designed as a 3/2-way directional control valve and is preferably used in automatic transmissions of motor vehicles. This hydraulic valve consists, on the one hand, of an electromagnet having a coil winding, arranged on a spool, and a magnet housing enclosing the coil winding and, on the other hand, of a hydraulic part having a valve stem which has a pressure connection and also a tank connection and a consumer connection. In this case, the spool of the electromagnet and the valve stem of the hydraulic part are designed as a one-piece plastic body which has an axial longitudinal bore which is formed with different diameters and which is designed on the one hand as an armature space for an axially movable magnet armature and on the other hand as a control region for a closing body connected to the magnet armature. In addition, the magnet housing at the electromagnet of the hydraulic valve continues from its shell enclosing the coil winding into a section which spans the end face of the spool and has an annular collar which projects into that part of the longitudinal bore of the plastic body which is designed as armature space and at the same time forms a top magnet pole of the electromagnet. At the same time, a cylindrical pole core projects from the other side into that part of the longitudinal bore of the plastic body which is designed as armature space, this pole core being held in the longitudinal bore of the plastic body by a push-in plate, which can be pushed laterally into the plastic body and on the ends of which the magnet housing rests, and thus forming together with the push-in plate a magnet pole of the electromagnet, this magnet pole being connected to the magnet housing in a magnetically conductive manner. In this case, the pole core of the bottom magnet pole has an encircling annular groove and the plastic body has a radially continuous slot, into which the push-in plate of U-shaped design is pushed from the outside in such a way that its two legs engage in the annular groove of the pole core. By means of a riveted connection, the magnet housing is then fastened to the ends of the push-in plate, which project from the plastic body on both sides, and at the same time a magnetic connection is produced between the two components.

However, a disadvantage with this known electromagnetic hydraulic valve is that it has no fastening elements at all for fixing the hydraulic valve in a push-in bore, since it is conceived for the control of automatic transmissions in motor vehicles, and such directional control valves generally arranged next to one another in groups are usually fixed together axially in a sandwich arrangement in their push-in bores by a separate pressure plate screwed to the engine. However, directional control valves for controlling a variable valve drive of an internal combustion engine are usually fastened in individual push-in bores on the engine block of the internal combustion engine, so that the known hydraulic valve, for this intended purpose, first has to be provided with additional fastening elements which are designed, for example, like the separate retaining lugs or the like arranged on the magnet housing of the hydraulic valve disclosed in DE 199 37 969 A1. However, such additional fastening elements generally increase the outlay in terms of production and materials for the hydraulic valve and therefore contribute to an adverse increase in its manufacturing costs. This also applies to the pole core, of relatively bulky design, of the bottom magnet pole of the known hydraulic valve, this pole core, due to its mass, not only requiring a considerable amount of material but also adversely increasing the weight of the hydraulic valve as a result. In addition, in the case of the known hydraulic valve, the two-piece design of the bottom magnet pole of the electromagnet has proved to be disadvantageous to the effect that the desired ease of fitting of the push-in plate on the hydraulic valve requires greater tolerances between the push-in plate and the annular groove in the pole core, and therefore larger air gaps form between the magnetic-flux transfer areas, which are relatively small anyway, of both components, and these air gaps impair even further the magnetic transfer of the lines of force between both components.

OBJECT OF THE INVENTION

The object of the invention is therefore to conceive an electromagnetic hydraulic valve, particularly a 3/2-way directional control valve for controlling a variable valve drive of an internal combustion engine, which hydraulic valve is distinguished by a low mass of its component parts and by simple fastening elements, which can be produced cost-effectively, for fastening it to the engine block of the internal combustion engine, and in which hydraulic valve a simple and reliable magnetic connection between the bottom magnet pole and the magnet housing of its electromagnet is ensured.

SUMMARY OF THE INVENTION

According to the invention, this object is achieved in an electromagnetic hydraulic valve according to the preamble of claim 1 in such a way that the bottom magnet pole of the electromagnet of the hydraulic valve is formed by an annular disk integrally cast in its plastic body and, by means of a plurality of free sections of the outer circumference of this annular disk and by means of a plurality of radial webs arranged at the outer circumference of this annular disk, is designed both as an element for fastening the magnet housing to the hydraulic valve and as an element for fastening the hydraulic valve to the engine block of the internal combustion engine.

In an expedient development of the hydraulic valve designed according to the invention, the annular disk forming the bottom magnet pole is in this case preferably formed at its outer circumference with three circular-ring-segment-shaped radial webs, arranged offset from one another by 120° and between which three free sections likewise arranged offset from one another by 120° remain in each case. Here, both the radial webs and the free sections at the outer circumference of this annular disk have an identical segment length in the circumferential direction, so that a symmetrical outer contour is obtained at the outer circumference of the annular disk. However, it is also possible to design the segment length of the radial webs to be greater than or smaller than the segment length of the free sections or to also design the radial webs and/or the free sections with irregular segment lengths. It is likewise possible, instead of three radial webs and three free sections at the outer circumference of the annular disk, to arrange said radial webs and said free sections in a smaller or larger number with a symmetrical or asymmetrical angular spacing offset from one another at the outer circumference of the annular disk and to form them with identical or irregular segment lengths.

A further feature of the annular disk forming the bottom magnet pole of the hydraulic valve designed according to the invention is that it is formed at its inner circumference with a coaxial annular collar which projects into that part of the longitudinal bore of the plastic body which is designed as armature space. This annular collar, preferably integrally formed on the inner circumference of the annular disk at right angles to the surface of the latter, extends in the direction of the top magnet pole of the electromagnet and serves to optimize the transfer of the magnetic lines of force from the top magnet pole via the magnet armature to the bottom magnet pole of the electromagnet. To fix the annular disk in position in the plastic body, a plurality of coaxial apertures are additionally made in the annular disk around this annular collar and are preferably designed as circular punched holes, corresponding plastic transitions forming in said apertures during the injection molding of the plastic body. In addition, an especially suitable material for the annular disk has proved to be a low-carbon unalloyed deep-drawn steel, so that the annular disk with its outer and inner contours and with the apertures for fixing in position can be produced in an especially cost-effective manner by drawing in a progressive tool.

With regard to the magnet housing of the electromagnet, a further feature of the hydraulic valve designed according to the invention is that, due to three notches at its valve-stem-side marginal part, these notches being offset from one another by 120°, said magnet housing has three crenelated axial webs which are arranged offset from one another by 120°. In this case, both the notches and the axial webs on the magnet housing have an identical segment length in the circumferential direction, so that a symmetrical outer contour is likewise obtained at the marginal part of the magnet housing, this symmetrical outer contour, for the purpose of fastening the magnet housing to the hydraulic valve, being complementary to the outer contour, formed with three radial webs and three free sections, of the bottom magnet pole in the plastic body. In a design of the bottom magnet pole with more than or less than three radial webs having an identical or irregular segment length with symmetrical or asymmetrical angular spacing relative to one another, it is therefore necessary to adapt the notches and the axial webs on the magnet housing in such a way as to be complementary to the design of the radial webs and of the free sections on the bottom magnet pole.

In the fitted state of the hydraulic valve designed according to the invention, the notches of the magnet housing rest on the radial webs of the annular disk forming the bottom magnet pole, whereas the axial webs of the magnet housing, which extend between the radial webs of the annular disk, are flanged around the free sections of the outer circumference of the annular disk. Thus sufficiently large magnetic-flux transfer areas, with which a reliable magnetic connection between the bottom magnet pole and the magnet housing of the electromagnet is ensured, are obtained both between the notches of the magnet housing and the radial webs of the annular disk and between the axial webs of the magnet housing and the free sections of the outer circumference of the annular disk.

In an advantageous development of the invention, in order to fasten an electromagnetic hydraulic valve of such a design to the engine block of the internal combustion engine, only an appropriately positioned stepped bore in the engine block is required, this stepped bore, in addition to the hydraulically necessary diameter steps, having an additional step on which the hydraulic valve is mounted with the radial webs of the bottom magnet pole. In this case, the additional step is formed by the stepped bore being widened in diameter starting at the surface of the engine block, this widening in diameter corresponding to approximately twice the outer radius of the radial webs and having a depth corresponding to approximately twice the material thickness of the radial webs, so that the hydraulic valve can be radially and axially fixed on the formed step in the stepped bore by local displacement of material from the surface of the engine block into the stepped bore, for example by caulking. It has proved to be especially cost-effective and sufficient in this case to incorporate linear caulking in the form of a circular arc notch or the like in the surface of the engine block at the edge of the stepped bore opposite each of the radial webs on the bottom magnet pole, with which caulking the radial webs of the bottom magnet pole are locked in position on the step in the stepped bore, although spot-like caulking is also conceivable. However, instead of such fastening which can only be released again by destruction, it is also conceivable to lock the hydraulic valve in position in the stepped bore in the engine block of the internal combustion engine by nondestructive fastening, for example by a bayonet connection, which is formed by an encircling annular groove, made in extension of the step in the wall of the stepped bore and having axial insertion slots, and by radial webs of slightly wedge-shaped design in the circumferential direction.

A further advantageous configuration of the hydraulic valve designed according to the invention is that the plastic body has a plurality of longitudinal ribs on the wall of that part of its axial longitudinal bore which is designed as armature space, these longitudinal ribs being arranged in a uniformly distributed manner over the circumference and forming together with the top magnet pole of the electromagnet the armature guide of the magnet armature. In this case, the longitudinal ribs, preferably designed with a length corresponding to the distance between the top magnet pole and the annular collar of the bottom magnet pole, have a depth which corresponds to the material thickness of the top magnet pole, so that a continuously smooth armature guide in the armature space of the magnet armature is obtained. It is especially advantageous in this case that the longitudinal ribs in the armature space have only linear contact with the magnet armature and thus reduce the friction between the armature guide and the magnet armature or its hysteresis. On the other hand, the annular collar of the bottom magnet pole is not intended for guiding the magnet armature, but has a slightly larger inside diameter than the magnet armature in order to form an air gap between this annular collar and the magnet armature for avoiding a magnetic short circuit. However, since the armature space formed in this way is open at the top, it has also proved to be advantageous to additionally make a plurality of plastic deformations in the form of stamped embossments in the top magnet pole, these deformations projecting from the surface of the latter and being arranged at uniform distances apart parallel to the end face of the magnet armature and being designed as its captive locking means.

In addition, as a further feature of the hydraulic valve designed according to the invention, it is proposed that that part of the axial longitudinal bore of the plastic body which is designed as control region be designed as a local diameter reduction of the longitudinal bore in the valve stem, this diameter reduction having, in each case on the entry side and exit side, a first and a second ball valve seat and also a countersunk transition to the diameter of the longitudinal bore. Above and below this diameter reduction, the diameter of the axial longitudinal bore in the valve stem of the plastic body is preferably slightly smaller than that part of the longitudinal bore which is designed as armature space, whereas that part of the longitudinal bore which is designed as control region is reduced to about one third of the diameter of the rest of the longitudinal bore in the valve stem. In this case, the two ball valve seats are designed as concave bevels of the entry and the exit of the diameter reduction, these bevels adjoining the countersunk transitions of the diameter reduction to the diameter of the rest of the longitudinal bore.

Based thereon, the hydraulic valve designed according to the invention is furthermore characterized by the fact that its pressure connection is preferably formed by the orifice at which the axial longitudinal bore of the plastic body opens out from the end face of the valve stem, whereas the consumer connection and the tank connection of the hydraulic valve are preferably designed as transverse bores through the valve stem, which cross the longitudinal bore axially above and centrally relative to its diameter reduction. The pressure connection is in this case connected to a pressure-medium pump via a pressure-medium passage opening into the stepped bore of the hydraulic valve, whereas the transverse bores of the consumer connection and of the tank connection open into respective annular spaces inside the stepped bore, and these annular spaces in turn open into a pressure-medium passage to the respective variable valve drive of the internal combustion engine or are connected directly to the pressure-medium reservoir of the internal combustion engine. In addition, two O-rings held in encircling annular grooves are arranged at the lateral surface of the valve stem of the plastic body in each case above and below the consumer connection, these O-rings sealing off the individual connections of the hydraulic valve from one another inside the stepped bore.

Furthermore, it is proposed as an advantageous configuration of the hydraulic valve designed according to the invention that the closing body of the hydraulic valve essentially comprise a cylindrical pin which is in interaction with the magnet armature by means of its one end face, which bears against the magnet armature, and by means of a centering spigot which is integrally formed on this end face, is reduced in diameter and projects into an axial bore at the opposite end face of the magnet armature. From the production point of view and also as a weight-reducing measure, it is especially advantageous in this case to design the magnet armature as a hollow cylinder which is open on one side and can be produced as an extruded part, a hole aperture being punched out of the base of this hollow cylinder as an axial bore for the centering spigot of the closing body.

Furthermore, the closing body of the hydraulic valve designed according to the invention, at the lateral surface of the cylindrical pin, has a plurality of axial guide ribs extending away radially and with which the closing body is centered in the longitudinal bore of the plastic body. The centering of the closing body by means of such axial guide ribs therefore has proved to be advantageous because the axial guide ribs slide along the inner wall of the longitudinal bore of the plastic body at the level of the tank connection, and the distances between the axial guide ribs on the closing body thus ensure that the pressure medium inside the hydraulic valve can be drawn off without hindrance from the consumer connection along the closing body to the tank connection of the hydraulic valve and from there through between the radial webs of the bottom magnet pole from the stepped bore into the pressure-medium reservoir of the internal combustion engine. Four axial guide ribs arranged offset from one another by 90° on the lateral surface of the cylindrical pin have therefore proved to be especially expedient, the guide surfaces of which axial guide ribs have a rounded portion corresponding to the diameter of the longitudinal bore, and sufficiently large clearance spaces, through which the pressure medium can flow off without hindrance, are produced between these axial guide ribs. However, it would also be conceivable, instead of four axial guide ribs, to arrange only three or five of such axial guide ribs on the lateral surface of the cylindrical pin, or to integrally form the axial guide ribs in an equivalent manner on the inner wall of the longitudinal bore of the plastic body and to design the closing body as a cylindrical pin with a smooth lateral surface.

Finally, in a further configuration of the hydraulic valve designed according to the invention, it is proposed that the closing body, at its other end face, be designed as a hemisphere which is in interaction with the first ball valve seat at the diameter reduction of the longitudinal bore of the plastic body. When the electromagnet is energized and during the axial movement of the magnet armature and of the closing body which is caused as a result, this hemisphere is pressed into the first valve seat, so that the connection, which is continuously open in the de-energized state of the electromagnet, between the consumer connection and the tank connection of the hydraulic valve is closed. The closing body, at that end face of the cylindrical pin which is designed as a hemisphere, additionally has a push rod which projects through the diameter reduction and is in interaction with a loose closing ball which correlates with the second ball valve seat at the diameter reduction of the longitudinal bore of the plastic body. This closing ball is held in an axially movable manner in a cage which is arranged in the orifice of the axial longitudinal bore of the plastic body and which is preferably formed by a plurality of elastic arms integrally formed coaxially on the diameter reduction of the longitudinal bore of the plastic body and is continually pressed into the second ball valve seat when the pressure of the pressure medium is applied. This ensures that, in the de-energized state of the electromagnet, the pressure connection of the hydraulic valve remains closed and the connection between the consumer connection and the tank connection of the hydraulic valve remains open. When the electromagnet is energized, the connection between the pressure connection and the consumer connection is then opened, at the same time as the closing of the connection between the consumer connection and the tank connection, by the closing body pushing the closing ball out of the second valve seat against the pressure of the hydraulic pressure medium via the push rod at the other end face of said closing body. The hydraulic consumer can thus be supplied with the hydraulic pressure medium via the longitudinal bore in the diameter reduction of the plastic body and via the transverse bore, crossing the longitudinal bore, of the consumer connection of the hydraulic valve. When the electromagnet is de-energized, the loose closing ball is then pressed again by the pressure of the pressure medium into the second ball valve seat in the diameter reduction of the longitudinal bore of the plastic body, so that the pressure connection of the hydraulic valve is closed again and, due to the connection between the closing ball and the push rod of the closing body, both the closing body and the magnet armature of the electromagnet are axially displaced again into their initial position.

The electromagnetic hydraulic valve designed according to the invention, particularly a 3/2-way directional control valve for controlling a variable valve drive of an internal combustion engine, therefore has the advantage over the hydraulic valves known from the prior art that the bottom magnet pole of the electromagnet, which magnet pole is integrally cast in the plastic body of the hydraulic valve and is designed as a simple annular disk having a plurality of radial webs and a plurality of free sections at its outer circumference, is designed in addition to its electromagnetic functions both as an element for fastening the magnet housing to the hydraulic valve and as an element for fastening the hydraulic valve to the engine block of the internal combustion engine. As a result, it is no longer necessary to provide the hydraulic valve with additional fastening elements, such as separate retaining lugs or the like, so that the outlay in terms of production and materials for the hydraulic valve according to the invention is reduced and, due to its simple fastening by means of caulking, the cost of fitting it on the internal combustion engine is also reduced at the same time. Likewise, large magnetic-flux transfer areas between both components are formed by the magnet housing sitting on the bottom magnet pole and flanged around the latter, so that a reliable magnetic connection is ensured between the bottom magnet pole and the magnet housing of the electromagnet. In addition, all the metal parts of the hydraulic valve according to the invention can be produced in a cost-effective manner by chipless production processes and can be designed with reduced weight, so that a considerable reduction of the manufacturing costs for the hydraulic valve can be expected overall.

Other features and advantages of the present invention will become apparent from the following description of the invention which refers to the accompanying drawings.

BRIEF DESCRIPTION OF THE DRAWINGS

The invention is explained in more detail below with reference to an exemplary embodiment and is shown schematically in the associated drawings, in which.

DETAILED DESCRIPTION OF EMBODIMENTS OF THE INVENTION

Figure 1:
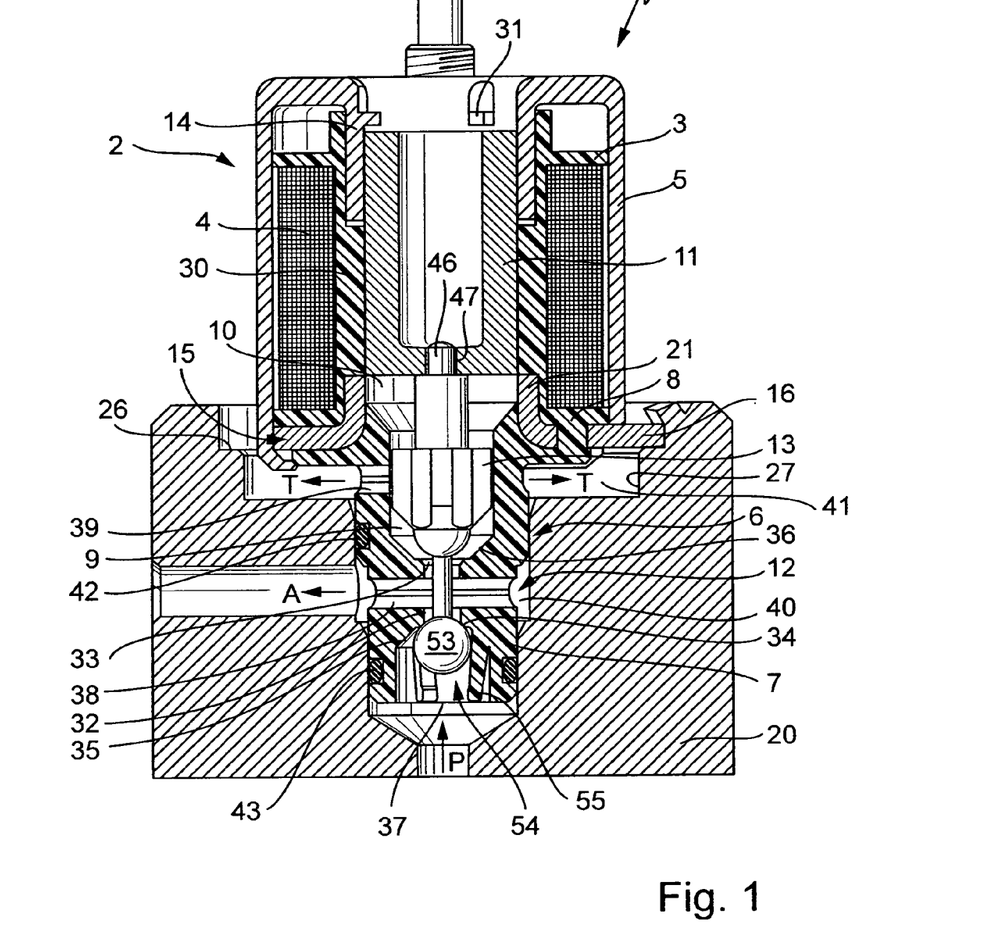
FIG. 1 shows a longitudinal section through a hydraulic valve according to the invention fitted on the engine block of an internal combustion engine.

FIG. 1 clearly shows an electromagnetic hydraulic valve 1 which is designed as a 3/2-way directional control valve and can be used for controlling a variable valve drive of an internal combustion engine. This hydraulic valve 1 consists, on the one hand, of an electromagnet 2 having a coil winding 4, arranged on a spool 3, and a magnet housing 5 enclosing the coil winding 4 and, on the other hand, of a hydraulic part 6 which is formed by a valve stem 7 having a pressure connection P, a tank connection T and a consumer connection A. It can also be seen from FIG. 1 that the spool 3 of the electromagnet 2 and the valve stem 7 of the hydraulic part 6 are designed as a one-piece plastic body 8 which has an axial longitudinal bore 9 which has different diameters and is designed on the one hand as an armature space 10 for an axially movable magnet armature 11 and on the other hand as a control region 12 for a closing body 13 connected to the magnet armature 11. In addition, the magnet housing 5 of the electromagnet 2 continues from its shell enclosing the coil winding 4 into a section which spans the end face of the spool 3 and has an annular collar which projects into that part of the longitudinal bore 9 of the plastic body 8 which is designed as armature space 10 and at the same time forms a top magnet pole 14 of the electromagnet 2.

Figure 2:
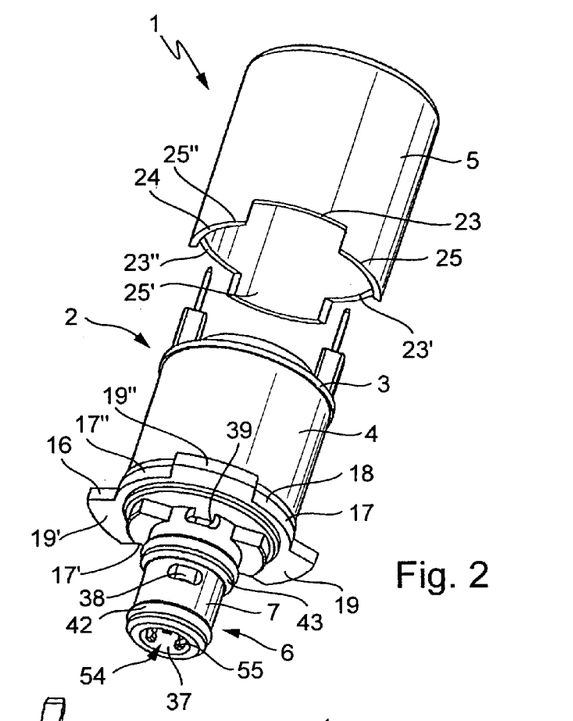
FIG. 2 shows a three-dimensional illustration of the hydraulic valve according to the invention before the magnet housing has been fitted.
Figure 3:
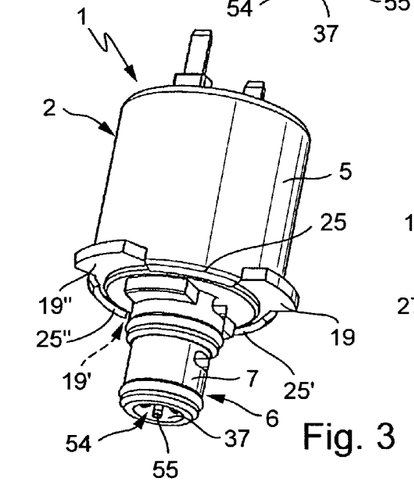
FIG. 3 shows a three-dimensional illustration of the hydraulic valve according to the invention after the magnet housing has been fitted.
Figure 4:
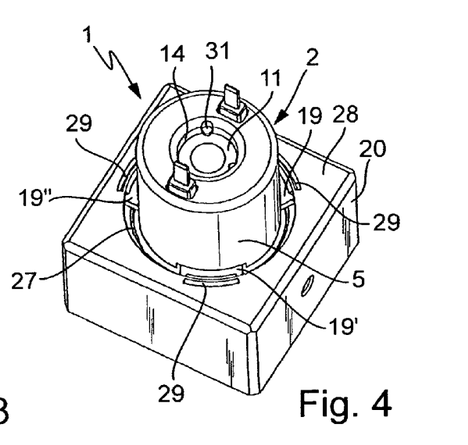
FIG. 4 shows a three-dimensional illustration of the hydraulic valve according to the invention after it has been fitted on the engine block of the internal combustion engine.

Furthermore, it can clearly be seen in FIG. 1 that a bottom magnet pole 15, connected to the magnet housing 5 in a magnetically conductive manner, of the electromagnet 2 likewise projects into that part of the longitudinal bore 9 of the plastic body 8 which is designed as armature space 10 and is formed according to the invention by an annular disk 16 integrally cast in the plastic body 8. FIGS. 2, 3 and 4 show that this annular disk 16, at its outer circumference 18, has a plurality of free sections 17, 17', 17" and a plurality of radial webs 19, 19', 19", so that the bottom magnet pole 15 of the electromagnet 2 of the hydraulic valve 1 can be used according to the invention both as an element for fastening the magnet housing 5 to the hydraulic valve 1 and as an element for fastening the hydraulic valve 1 to the engine block 20 of the internal combustion engine.

Figure 6:
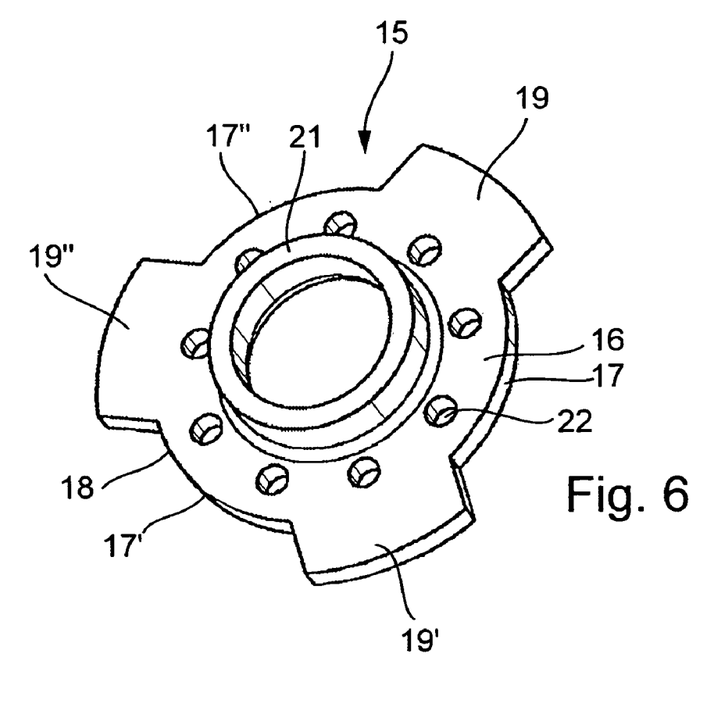
FIG. 6 shows a three-dimensional component part illustration of the bottom magnet pole of the hydraulic valve according to the invention.

In addition, the three-dimensional illustration according to FIG. 6 clearly shows that, in a practical embodiment, the annular disk 16 forming the bottom magnet pole 15 is formed at its outer circumference 18 with three circular-ring-segment-shaped radial webs 19, 19', 19", arranged offset from one another by 120°, and with three free sections 17, 17', 17" which are arranged offset from one another by 120° and which each have an identical segment length in the circumferential direction. It can also be seen in FIG. 6, in conjunction with FIG. 1, that the annular disk 16 is formed at its inner circumference with a coaxial annular collar 21, which projects into that part of the longitudinal bore 9 of the plastic body 8 which is designed as armature space 10 and serves to optimize the magnetic field pattern from the top magnet pole 14 via the magnet armature 11 to the bottom magnet pole 15 of the electromagnet 2. To fix the annular disk 16 in position in the plastic body 8, a plurality of coaxial apertures 22 are additionally made in the annular disk 21 around this annular collar 21, and corresponding plastic transitions, as indicated in FIG. 1, form in these apertures 22 during the injection molding of the plastic body 8.

Furthermore, it can clearly be seen from FIG. 2 that, in the unfitted state of the hydraulic valve 1, the magnet housing 5 of the electromagnet 2, due to three notches 23, 23', 23" at its valve-stem-side marginal part 24, these notches 23, 23', 23" being arranged offset from one another by 120°, has three crenelated axial webs 25, 25', 25" which are arranged offset from one another by 120°. These axial webs 25, 25', 25" are designed to be complementary to the bottom magnet pole 15 formed with three radial webs 19, 19', 19" and three free sections 17, 17', 17" and therefore likewise each have an identical segment length in the circumferential direction. Due to such a design of the magnet housing 5, the notches 23, 23', 23", in the fitted state, shown in FIG. 3, of the hydraulic valve 1, rest on the radial webs 19, 19', 19" of the bottom magnet pole 15, whereas the axial webs 25, 25', 25" of the magnet housing 5, which extend between the radial webs 19, 19', 19" of the bottom magnet pole 15, are flanged around the free sections 17, 17', 17" of the outer circumference 18 of the bottom magnet pole 15.

The fastening of the hydraulic valve 1 to the engine block 20 of the internal combustion engine is best illustrated in FIGS. 1 and 4, in which it can clearly be seen that the hydraulic valve 1 rests with the radial webs 19, 19', 19" of the bottom magnet pole 15 on an additional step 26 of a stepped bore 27 in the engine block 20 of the internal combustion engine and is radially and axially fixed on the engine block 20 by local displacement of material from the surface 28 of the engine block 20 into the stepped bore 27. In this case, the material is displaced in a cost-effective manner in each case by linear caulking in the form of a circular arc notch 29 which is incorporated in the surface 28 of the engine block 20 at the edge of the stepped bore 27 opposite each of the radial webs 19, 19', 19" of the bottom magnet pole 15.

With regard to the further construction of the hydraulic valve 1 designed according to the invention, it can also be seen from FIG. 1 that the plastic body 8 has a plurality of longitudinal ribs 30 on the wall of that part of its axial longitudinal bore 9 which is designed as armature space 10, these longitudinal ribs 30 being arranged in a uniformly distributed manner over the circumference and forming together with the top magnet pole 14 a continuously smooth armature guide of the magnet armature 11 of the electromagnet 2. The armature space 10, which is open at the top, is in this case additionally provided with a captive locking means for the magnet armature 11 by a plurality of punched embossments 31 being made in the top magnet pole 14, these punched embossments 31 projecting from the surface of the latter and being arranged at uniform distances apart parallel to the end face of the magnet armature 11.

In contrast, that part of the axial longitudinal bore 9 of the plastic body 8 which is designed as control region 12 is designed, in a practical embodiment, as a local diameter reduction 32 of the longitudinal bore 9 in the valve stem 7, as can also be seen from FIG. 1, this diameter reduction 32 having, in each case on the entry side and exit side, a first ball valve seat 33 and a second ball valve seat 34 and also a countersunk transition 35 or 36, respectively, to the diameter of the longitudinal bore 9 of the plastic body 8. In this case, the two ball valve seats 33 and 34 are designed as concave bevels of the entry and the exit of the diameter reduction 32, these bevels adjoining the countersunk transitions 35, 36 of the diameter reduction 32 to the diameter of the rest of the longitudinal bore 9.

Based thereon, in the hydraulic valve 1 according to the invention and shown in FIG. 1, the pressure connection P is formed by the orifice 37 at which the axial longitudinal bore 9 of the plastic body 8 opens out from the valve stem 7, whereas the consumer connection A and the tank connection T are designed as transverse bores 38, 39 through the valve stem 7, which cross the longitudinal bore 9 axially above and centrally relative to its diameter reduction 32. The pressure connection P is in this case connected to a pressure-medium pump (not shown) via a pressure-medium passage (not designated in any more detail) opening into the stepped bore 27, whereas the transverse bores 38, 39 of the consumer connection A and the tank connection T, as can clearly be seen, open into respective annular spaces 40, 41, which are in turn connected to the respective variable valve drive or to the pressure-medium reservoir of the internal combustion engine. The individual connections of the hydraulic valve 1 are then sealed off from one another inside the stepped bore 27 in the engine block 20 by two O-rings 42, 43 held in each case above and below the consumer connection A in encircling annular grooves on the lateral surface of the valve stem 7.

Figure 5:
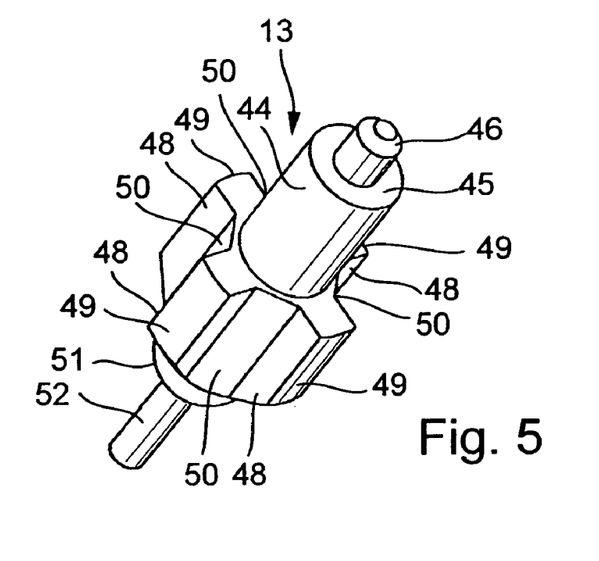
FIG. 5 shows a three-dimensional component part illustration of the closing body of the hydraulic valve according to the invention.

Finally, the closing body 13 of the hydraulic valve 1 according to the invention is depicted in FIG. 5 in a three-dimensional illustration, from which it can be seen that said closing body 13 essentially comprises a cylindrical pin 44 which, by means of its one end face 45, which bears against the magnet armature 11, and by means of a centering spigot 46 integrally formed on this end face 45 and projecting into an axial bore 47 of the magnet armature 11, is loosely in operative connection, in the manner shown in FIG. 1, with the magnet armature 11 of hollow-cylindrical design. In addition, four axial guide ribs 48 extending away radially are arranged on the lateral surface of the cylindrical pin 44, with which axial guide ribs 48 the closing body 13, as indicated in FIG. 1, is centered in the longitudinal bore 9 of the plastic body 8. Sufficiently large clearance spaces 50 are provided between these axial guide ribs 48, which are arranged offset from one another by 90° and are formed at their guide surfaces with a rounded portion 49 corresponding to the diameter of the longitudinal bore 9, and the hydraulic pressure medium inside the hydraulic valve 1 can be drawn off through these clearance spaces 50 without hindrance from the consumer connection A to the tank connection T and from there from the stepped bore 27 in the engine block 20.

In contrast, at the other end face 51 of the cylindrical pin 44, the closing body 13, as can also be seen from FIG. 5, is designed as a hemisphere, which is in interaction with the first ball valve seat 33 at the diameter reduction 32 of the longitudinal bore 9 of the plastic body 8. In addition, a push rod 52 is integrally formed on this end face 51 of the cylindrical pin 44, this push rod 52, as can be seen in FIG. 1, projecting through the diameter reduction 32 of the longitudinal bore 9 of the plastic body 8 and being in interaction with a loose closing ball 53 which correlates with the second ball valve seat 36 at the diameter reduction 32 of the longitudinal bore 9. FIG. 1 likewise clearly shows that this loose closing ball 53 is held in an axially movable manner in a cage 54 arranged in the orifice 37 of the axial longitudinal bore 9 of the plastic body 8 and continuously closes the second ball valve seat 34 or the pressure connection P of the hydraulic valve 1 due to the applied pressure of the pressure medium. In this case, the cage 54 is formed by a plurality of elastic arms 55 which are integrally formed coaxially on the diameter reduction 32 of the longitudinal bore 9 of the plastic body 8, are formed at their ends with retaining claws (not designated in any more detail) and terminate with the orifice 37 of the valve stem 7.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. An electromagnetic hydraulic control valve for controlling a variable valve drive of an internal combustion engine, the valve comprising:
   an electromagnet having a coil winding arranged on a spool, and a magnet housing enclosing the coil winding,
   a hydraulic part including a valve stem with a pressure connection, a tank connection and a consumer connection,
   the spool of the electromagnet and the valve stem of the hydraulic part are a one-piece body with an axial longitudinal bore having a length and having different diameters along the length,
   the longitudinal bore defining an armature space; an axially movable magnet armature in the bore,
   a closing body connected to the magnet armature, and the bore defining a control region for the closing body and the magnet armature, the magnet housing including an annular collar which projects into the armature space of the longitudinal bore of the body, and the collar defines a top magnet pole of the electromagnet, a bottom magnet pole of the electromagnet also projecting into the armature space of the longitudinal bore of the body, the bottom magnet pole is connected to the magnet housing in a magnetically conductive manner; the bottom magnet pole comprises an annular disk integrally in the body, the annular disk having a plurality of free sections with an outer circumference of the annular disk; a plurality of radial webs arranged at the outer circumference of the annular disk for fastening the magnet housing to the hydraulic valve and for fastening the hydraulic valve to an engine block of the internal combustion engine.

2. The hydraulic valve as claimed in claim 1, wherein the annular disk forming the bottom magnet pole includes three circular-ring-segment-shaped radial webs at the outer circumference of the disk and arranged offset from one another by 120° and includes three free sections arranged offset from one another by 120° and each having an identical segment length in the circumferential direction.

3. The hydraulic valve as claimed in claim 2, wherein the annular disk defining the bottom magnet pole has an inner circumference including a coaxial annular collar which projects into the armature space of the longitudinal bore of the body; and a plurality of coaxial apertures arranged around the coaxial annular collar as plastic transitions for fixing the position of the annular disk in the plastic body.

4. The hydraulic valve as claimed in claim 3, wherein the body has a plurality of longitudinal ribs on a wall of a part of the axial longitudinal bore that is the armature space, the longitudinal ribs are arranged uniformly distributed over the circumference and the ribs together with the top magnet pole form a continuously smooth armature guide for the magnet armature.

5. The hydraulic valve as claimed in claim 2, wherein the magnet housing of the electromagnet includes three notches at a valve-stem-side marginal part of the magnet housing, the notches being arranged offset from one another by 120°.

6. The hydraulic valve as claimed in claim 5, wherein in a fitted state of the hydraulic valve, the notches of the magnet housing rest on the radial webs of the bottom magnet pole, whereas the axial webs of the magnet housing extend between the radial webs of the bottom magnet pole and are flanged around the free sections of the outer circumference of the bottom magnet pole.

7. The hydraulic valve as claimed in claim 1, wherein the hydraulic valve with the radial webs of the bottom magnet pole rest on a step of a stepped bore in an engine block of the internal combustion engine and the radial webs are adapted to be radially and axially fixed on the engine block by local displacement of material from the surface of the engine block into the stepped bore.

8. The hydraulic valve as claimed in claim 1, wherein the control region of the axial longitudinal bore of the body has a local diameter reduction of the longitudinal bore in the valve stem, the diameter reduction having an entry side and an exit side, respectively; a first and a second ball valve seat and a respective countersunk transition to a diameter of the longitudinal bore of the body.

9. The hydraulic valve as claimed in claim 8, wherein the pressure connection comprises an orifice at which the axial longitudinal bore of the body opens out from the valve stem; the consumer connection and the tank connection comprise transverse bores crossing through the valve stem and crossing the longitudinal bore axially above and centrally relative to the diameter reduction of the bore.

10. The hydraulic valve as claimed in claim 9, wherein the closing body of the hydraulic valve comprises a cylindrical pin including an end face which interacts with the magnet armature by bearing against the magnet armature and comprises a centering spigot integrally formed on the end face; the cylindrical pin being reduced in diameter and projecting into an axial bore of the magnet armature.

11. The hydraulic valve as claimed in claim 10, wherein the cylindrical pin includes a lateral surface, at the lateral surface of the cylindrical pin the closing body has a plurality of axial guide ribs, extending away radially, for centering the cylindrical pin in the longitudinal bore of the body and the closing body has another end face in a hemisphere form which correlates with the first ball valve seat at the diameter reduction of the longitudinal bore.

12. The hydraulic valve as claimed in claim 11, wherein at the other end face of the cylindrical pin, the closing body includes a push rod which projects through the diameter reduction of the longitudinal bore of the body and interacts with a loose closing ball, and the loose closing ball correlates with the second ball valve seat at the diameter reduction of the longitudinal bore.

13. The hydraulic valve as claimed in claim 12, further comprising a cage holding the loose closing ball correlating with the second ball valve seat in an axially movable manner, the cage being arranged in the orifice of the axial longitudinal bore of the body.

14. The hydraulic valve as claimed in claim 13, wherein the cage is formed of a plurality of elastic arms integrally formed coaxially on the diameter reduction of the longitudinal bore of the plastic body.

15. The hydraulic valve as claimed in claim 1, wherein the valve is a 3/2-way directional control valve.

16. The hydraulic valve as claimed in claim 1, wherein the one piece body is of plastic.

17. The hydraulic valve as claimed in claim 1, wherein the valve-stem-side magnet part of the magnet housing includes three crenelated axial webs which are arranged offset from one another by 120° and each have an identical segment length in the circumferential direction.

* * * * *